March 18, 1969     B. R. PINCUS     3,433,961
SCANNING ASPECT SENSOR EMPLOYING AN APERTURED
DISC AND A COMMUTATOR
Filed March 31, 1967

INVENTOR
Bruce R. Pincus

BY
ATTORNEYS

United States Patent Office 3,433,961
Patented Mar. 18, 1969

3,433,961
SCANNING ASPECT SENSOR EMPLOYING AN APERTURED DISC AND A COMMUTATOR
Bruce R. Pincus, Davidsonville, Md., assignor to the United States of America as represented by the Administrator of the National Aeronautics and Space Administration
Filed Mar. 31, 1967, Ser. No. 628,248
U.S. Cl. 250—203                    10 Claims
Int. Cl. G01j 1/20

ABSTRACT OF THE DISCLOSURE

There is herein disclosed an aspect sensor having a rotatable apertured member with a single photosensitive means behind the aperture for receiving light from a radiating body. The rotatable member is driven in synchronism with a commutator which normally produces a synchronization pulse followed by a series of electrical pulses at a given level. A detection pulse at a different level is produced, however, when the aperture faces the radiating body. The normal pulses between the synchronization pulse and the detection pulse are counted to provide an indication of the direction of the radiating body with respect to the aspect sensing device.

---

Figure 2:
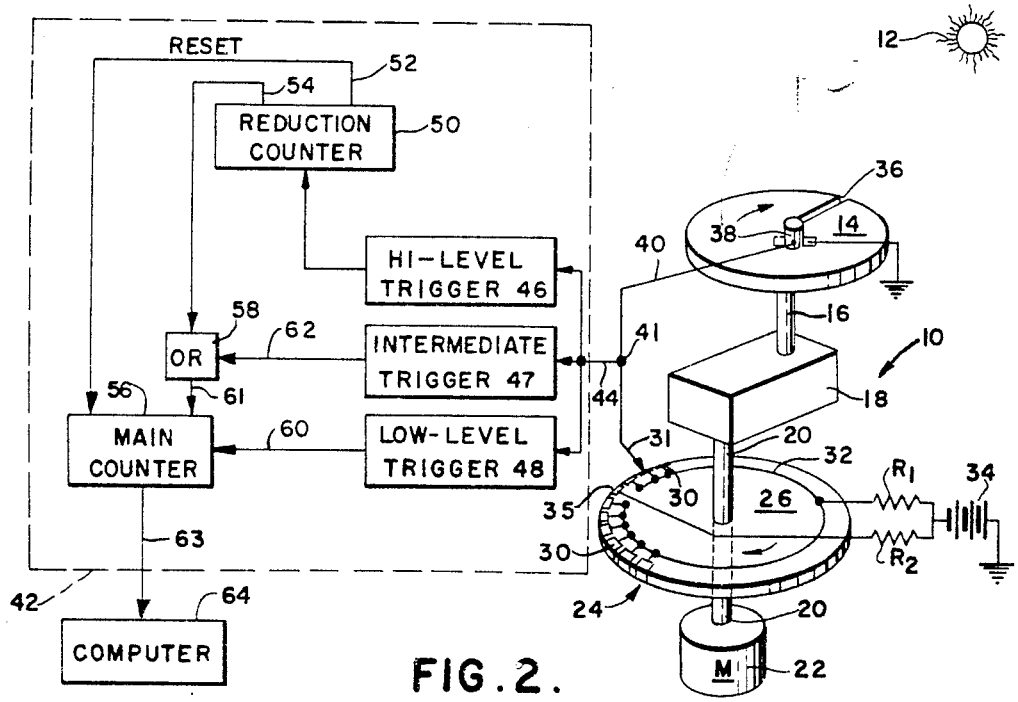

The invention described herein was made by an employee of the United States Government and may be manufactured and used by or for the Government for governmental purposes without the payment of any royalties thereon or therefor.

It is frequently necessary to determine the direction of the sun or some other radiant body with respect to a space vehicle. Similarly, it is frequently necessary to determine the direction of light radiating bodies with respect to a terrestrial location.

A number of approaches have been suggested for providing reliable aspect sensing devices for sensing these radiant energy emitting bodies. While the prior devices have proven generally satisfactory, they have also proven to be quite delicate, sensitive to shocks and vibrations, and largely complex in nature. Consequently, the cost of such devices has been quite high, particularly in view of their sometimes delicate nature. Hence, it is an object of this invention to provide a relatively rugged, simple and lightweight device for sensing the direction of a radiating body with respect to a vehicle or platform on which the inventive device is mounted.

Prior art aspect sensors are not usually sufficiently accurate even though they are frequently comprised of a plurality of radiation sensitive elements. Consequently, it is another object of this invention to provide a more accurate aspect sensor which has fewer radiation detection elements than many of the prior devices.

The objects of this invention are achieved by a rotating body having a slot therein with a photosensitive means located behind the slot. The rotating body is driven through reduction gearing by a motor which also drives a commutator at a fixed speed ratio with respect to the rotating body. A wiper sequentially connects the photosensitive means with each of the contacts of the commutator which are in turn connected to a voltage source by various suitable resistance elements.

As the wiper sequentially contacts the segments of the commutator a series of pulses of a given magnitude are generated. When the slot is facing the radiant body, however, the radiation impinges on the photosensitive means to lower the resistance of the corresponding commutator's electrical connection whereby the level of the particular commutator's output pulse decreases and acts as a detection pulse. In addition, a counting device is operative in response to a synchronizing pulse from one of the commutator's segments to count the commutator pulses. The counter is also operative in response to a detection pulse to read out its pulse count to a suitable utilization circuit or device. In this manner the counter's total is representative of the radiant body's direction with respect to the aspect sensor.

The foregoing and other objects, features and advantages of this invention will be apparent from the more particular description of a preferred embodiment thereof as illustrated in the accompanying drawings. The drawings are not necessarily intended to be to scale, but rather are presented so as to illustrate the principles of the invention in clear form.

Figure 3:
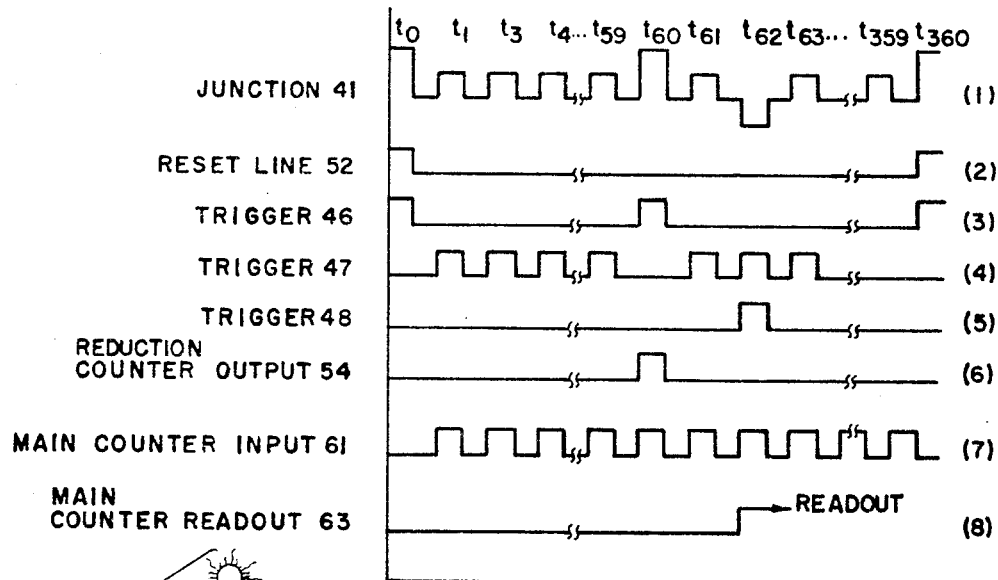
Figure 1:
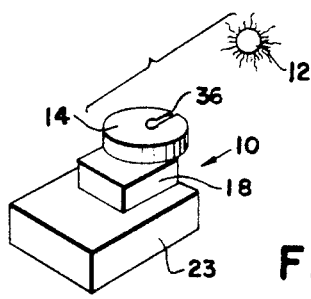

In the drawings:
FIG. 1 is a perspective view of a device for housing a preferred embodiment of the invention;
FIG. 2 is a schematic perspective view of a preferred embodiment of the invention; and
FIG. 3 is a timing diagram used in connection with a description of the FIG. 1 device.

A preferred embodiment of the invention will now be described in connection with FIGS. 1 and 2 wherein a solar aspect sensor 10 is used for determining its associated structure's position with respect to the sun 12. Therein, a rotating disc 14 is driven by an output shaft 16 of a speed reduction drive 18 which has an input shaft 20 driven by a motor 22 mounted in a housing 23. A commutator, generally designated 24 in FIG. 2, is mounted on and driven by shaft 20. The commutator includes a rotatable support plate 26 having mutually insulated segments 30 located about its periphery. A wiper 31 is mounted so that it sequentially contacts each of the commutator's segments 30 as they are rotated past the wiper. All but one of the segments 30 are connected by a common conductor 32 and a first resistor R1 to one side of a voltage source 34. The remaining segment 35 is separate from the rest and is connected by means of a second resistor R2 to the voltage source 34 as shown in FIG. 1. For purposes of illustration it will be assumed that the resistance of R1 is greater than the resistance of R2.

A radial slot 36 is formed in the rotating disc 14 and a photosensitive element 38 is located at the innermost termination of the slot 36. In this respect, a suitable photosensitive element is of the type whose resistance decreases considerably when it is subjected to radiation. One side of the photosensitive element 38 is connected to ground and the other is connected by a conductor 40 at junction 41 to the wiper 31.

A detecting and counting circuit generally designated as 42 is connected to conductor 40 at junction 41 by a conductor 44. The detecting and counting circuit 42 includes three trigger circuits 46, 47, and 48. Trigger circuit 46 is operative to generate an output pulse in response to relatively high signal levels at junction 41. Provided there is no light impinging upon the photocell 38, a relatively high level signal of this type occurs each time the single commutator element 35 passes the wiper element 31.

The second trigger circuit 47 provides an output signal in response to an intermediate signal level at junction 41. Provided the photocell 38 is in its high resistance state a signal of this type occurs each time one of the commutator segments 30 passes the wiper element 31.

The third trigger 48 only produces an output signal when the junction 41 is at a relatively low voltage level. A signal of this type occurs whenever light impinges upon the photocell 38 thereby lowering its resistance so as to increase the voltage dropped across the segments 30 (or 35) and decrease the voltage level at junction 41.

The output from the high level trigger 46 is delivered to a reduction counter 50. This counter has two output lines 52 and 54. Line 52 delivers reset pulses to a main counter 56; and line 54 delivers pulses to an OR gate 58. The reduction counter 50 is of a conventional type having suitable stages which both advance one count and deliver an output pulse on line 54 each time the reduction counter receives a pulse from the high level trigger 46. As soon as it has reached a predetermined count, however, the reduction counter both delivers a reset pulse to the main counter 56 on line 52 and resets its own stages so that its counting cycle can be repeated. As will be noted more fully shortly the particular predetermined count at which the reduction counter generates its reset pulse on line 52 is dependent upon the speed reduction between the commutator plate 26 and the rotating disc 14. In this manner a reset pulse is only generated once for each complete revolution of the scanning disc 14, regardless of the number of times the commutator has revolved.

The signals from the intermediate trigger 47 are delivered on line 62 to the OR gate 58 which, in turn, delivers all of the pulses from lines 54 and 62 to the main counter 56 by means of a line 61.

The main counter 56 is operative to count each of the pulses from the OR gate 58. Consequently, except for being reset each time it receives a pulse from the reduction counter on line 52, the main counter is advanced one count each time one of the commutator's segments 30 or 35 passes under the wiper 31.

The output pulses from the low level trigger 48 are delivered on line 60 to the main counter 56 which is operative in response to these pulses to read out its count into a computer or other utilization device 64 by means of line 63. The elements forming the detecting, triggering, and counting circuits are conventional and may be selected from any of several well-known devices for performing the particular desired functions. Hence, they will not be described in further detail.

In operation, the motor 22 rotates the shaft 20 and plate 26 so as to cause the commutator segments 30 to be sequentially moved past the wiper arm 31. As each segment 30 contacts the wiper 31 a voltage from source 34 is applied through resistor R1; common conductor 32; commutator segments 30; and through the wiper 31, to both the counting circuits 42 and the photo-sensitive means 38. When the radial slot 36 is not aligned with the sun, no light can impinge on the photosensitive element 38 and the element is in a condition of high resistance so as to maintain relatively high voltage levels at junction 41. When these conditions exist, rotation of the commutator segments 30 past wiper arm 31 causes a series of intermediate level pulses to be applied to conductor 44 whereby the intermediate trigger sends a corresponding series of stage advancing pulses to the main counter 56 through the OR gate 58. When commutator segment 35 contacts the wiper 31, on the other hand, its current from the battery 34 passes through resistance $R_2$ to produce a high voltage level at junction 41 whereby the high level trigger delivers a pulse to the reduction counter 50. As noted above, up to a predetermined number, each pulse received by the reduction counter causes both it and the main counter to advance one count.

In the illustrated embodiment the speed reduction between the commutator ring 26 and the scanning disc 14 is six to one. The reduction counter's "predetermined count," therefore, is six. Consequently, every sixth time the single commutator element 35 passes the wiper 31, the resulting pulse from the high-level trigger 46 causes both the reduction counter and the main counter to be reset. In this manner the commutator segment 35 passes both counting pulses and synchronizing pulses, wherein its sixth pulse is a synchronizing pulse and its five prior pulses are counting pulses. It should be appreciated at this point, however, that if a reduction ratio of other than six to one is employed, the reduction counter should be modified so as to produce its reset or synchronizing pulse in accordance with that ratio. Similarly, where there is no speed reduction the reduction counter can be eliminated so that the high level trigger's synchronization pulses are passed directly to the main counter.

When the radial slot 36 faces the sun 12, light from the sun enters the slot and impinges upon photosensitive means 38 to drop its resistance. This immediately causes the voltage at the junction 41 to drop to a low level, whereby the low-level trigger 48 delivers an output pulse to the main counter which is thereby read out into the computer 64.

FIG. 3 represents a timing diagram for the voltage levels occurring across the various components at different times. Assume that the commutator segment 35 has just passed under the wiper arm 31 at $t_0$. At this time the main counter 56 is reset to zero and the various portions of the counter circuit 42 are at their voltage levels indicated at $t_0$ in FIG. 3.

At $t_1$ the first of the common commutator elements 30 is under the wiper arm 31 so that junction 41 is at an intermediate voltage level. Hence, trigger 47 produces an output on line 62 to OR gate 58 which passes the pulse on line 61 to advance the main counter. As shown on lines 1, 4, and 7 in FIG. 3 each succeeding pulse passed through the succeeding commutator segments 30 produces a similar pulse to the main counter 61 until such time as the single commutator segment 35 again passes under the wiper arm 31 at time $t_{60}$. In this respect, it is assumed in this illustrative example that the commutator has 60 individual segments; 59 of which are commonly connected and one (35) of which is isolated as described above. Clearly, the number of segments can be varied to suit any given application.

When the single commutator segment 35 again arrives under the wiper arm 31, the voltage level at junction 41 again rises to its high level. This time, however, because the reduction counter 50 has not yet reached a count of six, there is no output on reset line 52. Instead, the reduction counter provides an output on line 54 which is passed through OR gate 58 to the main counter as indicated on line 6 in FIG. 3. In the meanwhile, the intermediate trigger 47 has supplied a series of 59 pulses to the main counter 56 as indicated on line 4 of FIG. 3.

During the above-described operation the scanning disc 14 has completed one sixth of a revolution about its shaft 16. In other words, it has rotated 60° from its starting point. Assume now that the sun in FIG. 2 is located at 62° from the scanning disc's starting point. Under these circumstances, the sun's rays pass through the slot 36 at $t_{62}$ and strike the photocell 38 lowering its resistance to thereby lower the voltage level at junction 41 to the low level illustrated at $t_{62}$ on line 1 of FIG. 3. At this time the low level trigger 48 (line 5, FIG. 3) produces an output pulse on line 60 causing the main counter 56 to read a "sixty-two" count into the computer 64. In this manner, the computer is informed that the sun is 62° away from the scanning disc's starting point. In this respect it should also be noted that although the counter's output is described as being read into a computer this is not necessarily the case. For example, the counter could also be read out into a recorder or other presentation device without deviating from the invention.

At $t_{63}$ the next commutator segment passes under the wiper arm 31. If the sun no longer illuminates the photocell 38 the junction 41's voltage level raises to its intermediate point so as to again cause trigger 47 to provide an output pulse to the main counter 56. This continues until the sixth time that the single commutator element 35 passes under the wiper arm 31. When this occurs at $t_{360}$ junction 41 is again raised to its high voltage level whereby trigger 46 provides its sixth output pulse during the cycle to the reduction counter 50. As noted above, this causes the reduction counter 50 to both reset itself to zero and provide an output pulse on reset line 52 in FIG. 2 as illustrated on line 2 of FIG. 3. This, in turn, causes the main counter to be reset to zero so as to complete a cycle of operation.

It should be appreciated that although the above description was used in connection with determining the azimuth of the sun with respect to the scanning disc 14, it is equally suitable for use in connection with aspect sensing of other radiant bodies either in azimuth, elevation, or other coordinates. In any event, it should be appreciated that the counter setting at the time that it is read out is directly proportional to the rotation of disc 14 subsequent to the generation of a given synchronization signal as represented by a pulse from the reduction counter on reset line 52. Hence, because the positional relationships between the slot 36 and the various commutator segments are fixed, the count which the computer receives from the main counter 56 is representative of the radiant body's direction with respect to the aspect sensor 10.

The system is made extremely accurate by virtue of the speed reduction drive 18. For example, in the above described embodiment, each pulse from the commutator segments 30 represents one degree of rotation of the scanning disc 14. Merely by increasing the speed reduction to a ratio of twelve-to-one the system's accuracy is very simply increased so that the radiant body's direction with respect to the aspect sensor may be determined within one-half of one degree. Moreover, although very accurate, the structure is nevertheless lightweight whereby it is admirably suited for use in connection with space vehicles.

While the invention has been particularly shown and described with reference to a preferred embodiment thereof, it will be understood by those skilled in the art that various changes in form and details may be made therein without departing from the spirit and scope of the invention. For example, the wiper 31 can be driven by the motor 22 while the commutator ring may be held stationary. Similarly, the photosensitive means 38 can be located within a hollow shell so that it is not rotated with the disc 14, but instead receives its light only when the slot of the disc is oriented toward a source of light. In the same vein, other circuit modifications may also be employed. For example, junction 41 may be biased at various voltage levels. The invention, therefore should only be limited by the following claims wherein:

I claim:
1. Radiation aspect sensing device for sensing the direction of a radiation emitting body with respect to said device, comprising:
a rotatable apertured member having an aperture through which radiation from said radiation emitting body passes when said aperture faces said body;
a commutator assembly including a voltage source, a wiper arm, and a plurality of contact segments relatively movable with respect to said wiper arm so that said commutator assembly produces a series of output pulses each time that said wiper arm contacts one of said segments;
drive means for rotating said apertured member and the movable portion of said commutator assembly in fixed speed ratio to each other;
a counter for receiving said output pulses from said commutator assembly;
radiation sensitive means associated with said aperture so that radiation passing through said aperture from said radiation emitting body alters the electrical characteristics of said radiation sensitive means; and
means operative in response to said change of electrical characteristics of said radiation sensitive means for reading out said counter to indicate the number of pulses received by said counter from said commutator assembly and thereby the position of said radiant body with respect to a given position of said light aspect sensing device.

2. The apparatus of claim 1 including a speed reducing means for driving said apertured member at a lower speed than the movable portion of said commutator assembly.

3. The apparatus of claim 2 wherein said wiper assembly is stationary with respect to said radiation aspect sensing device and the plurality of contact segments are movable with respect thereto.

4. The apparatus of claim 3 including a means for generating a synchronizing pulse each time that said apertured member is rotated into a predetermined position with respect to said aspect sensing device.

5. The apparatus of claim 1 including a means for generating a synchronizing pulse each time said apertured member is rotated into a predetermined position with respect to said aspect sensing device.

6. The apparatus of claim 5 wherein said wiper arm is stationary with respect to said radiation aspect sensing device and the plurality of contact segments are movable with respect thereto.

7. The apparatus of claim 6 including a speed reducing means for driving said apertured member at a lower speed than said plurality of contact segments.

8. The apparatus of claim 1 wherein said wiper arm is stationary with respect to said radiation aspect sensing device and the plurality of contact segments are movable with respect thereto.

9. The apparatus of claim 8 including a means for generating a synchronizing pulse each time said apertured member is rotated into a predetermined position with respect to said aspect sensing device.

10. The apparatus of claim 9 including a speed reducing means for driving said apertured member at a lower speed than said plurality of contact segments.

References Cited

UNITED STATES PATENTS 3,178,992    4/1965    Murphy et al. _____ 250—203 X
3,220,298    11/1965    Powell et al. _____ 250—203 X JAMES W. LAWRENCE, Primary Examiner.

C. R. CAMPBELL, Assistant Examiner.

U.S. Cl. X.R.

250—83.3, 233